May 6, 1941. G. C. HARBISON 2,241,064
FOOD STORAGE RECEPTACLE FOR REFRIGERATORS
Filed Oct. 31, 1939
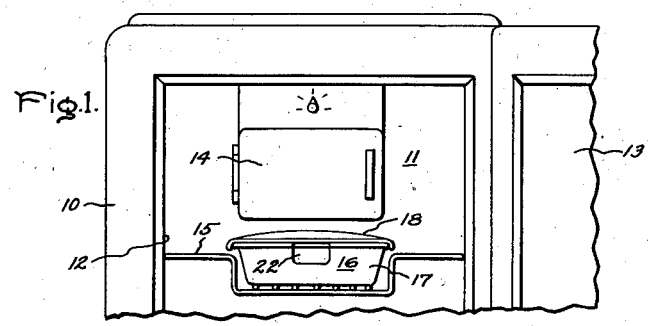
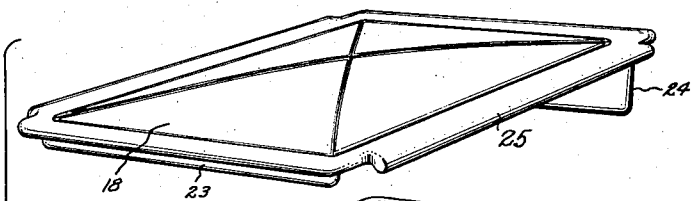
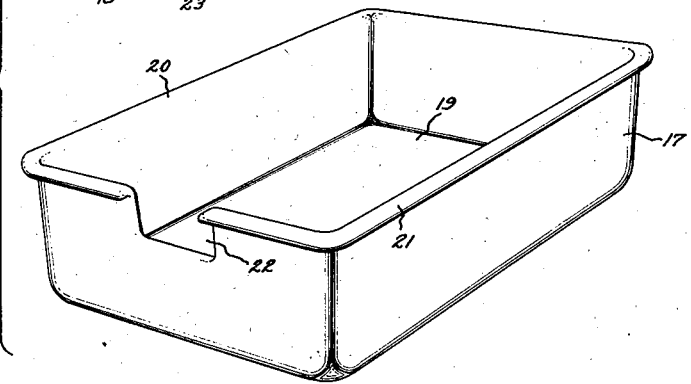
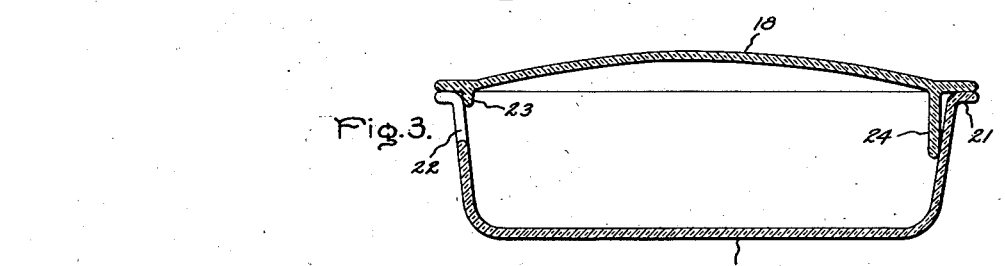
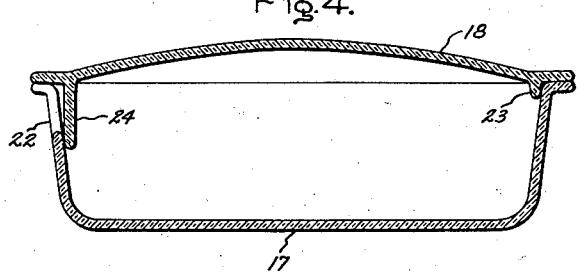
Inventor:
George C. Harbison,
by Harry E. Dunham
His Attorney.

Patented May 6, 1941

2,241,064

UNITED STATES PATENT OFFICE 2,241,064

FOOD STORAGE RECEPTACLE FOR REFRIGERATORS

George C. Harbison, Erie, Pa., assignor to General Electric Company, a corporation of New York Application October 31, 1939, Serial No. 302,178

4 Claims. (Cl. 62—1)

My invention relates to refrigerators, and more particularly to food storage receptacles associated with the refrigerated compartments of refrigerators for preserving fruits, green vegetables, meats, and the like.

The refrigerated compartment of a household refrigerator is usually maintained at an average temperature between 40° F. and 45° F. for general refrigeration purposes. An average temperature within this range may be maintained in the refrigerated compartment by the convection currents of air set up therein by a refrigerant evaporator located in the upper portion of the refrigerated compartment. In the usual refrigerator this result is obtained by maintaining the temperature of the surface of the evaporator considerably below 32° F., for example, approximately 20° F. During the operation of the refrigerator the evaporator removes a considerable amount of the moisture in the air circulated in the refrigerated compartment, which appears upon the surface of the evaporator in the form of frost, resulting in the maintenance of an atmosphere in the refrigerated compartment having a low relative humidity, often as low as 40 per cent. While a storage atmosphere having a temperature within the range mentioned and a relative humidity as low as 40 per cent is satisfactory for the preservation of some foods, certain types of foods, such, for example, as green vegetables and meats, may be more satisfactorily preserved in a storage atmosphere having a lower temperature and a higher relative humidity. For example, I have found a storage atmosphere having a temperature of approximately 36° F. and a relative humidity of approximately 95 per cent to 100 per cent to be ideal for the preservation of green vegetables, and a storage atmosphere having a temperature of approximately 36° F. and a relative humidity of approximately 85 per cent to be ideal for the preservation of meats. When green vegetables are stored in an atmosphere having the preservation conditions above set forth, they retain their crispness and remain in an unwilted condition for a considerable period of time. Likewise, when fresh meats are stored in an atmosphere having the preservation conditions above set forth, they retain substantially their original moisture content and remain in a good condition for a considerable period of time.

An object of my invention is to provide an improved construction and arrangement of a food storage receptacle in the refrigerated compartment of a refrigerator, whereby substantially the temperature and relative humidity set forth above are obtained.

A further object of my invention is to provide a food storage receptacle for the refrigerated compartment of a refrigerator having an improved arrangement for varying the preservation conditions of the air in the receptacle to accommodate the storage of different types of foods.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a partial view of a refrigerator of the domestic type provided with a food storage receptacle embodying my invention; Fig. 2 is an enlarged exploded perspective view of the food storage receptacle shown in Fig. 1; Fig. 3 is a sectional view of the food storage receptacle; and Fig. 4 is a sectional view similar to Fig. 3 with the cover member reversed.

In accordance with my invention, I have provided a food storage receptacle 16 having a ventilating opening 22 in a wall thereof and a reversible cover 18 having a pair of elements of different size or area and carried by the cover such as depending ribs 23 and 24 on the underside thereof to provide selective ventilation through the opening 22 according to whether the shorter rib 23 or the longer rib 24 is adjacent the opening 22, the rib 24 being so dimensioned as to cover the opening 22 when adjacent thereto for restricting ventilation, and the rib 23 being so dimensioned that when disposed adjacent the opening 22 an increased amount of ventilation is provided.

Referring to the drawing, in Fig. 1 I have shown a household refrigerator 10 provided with a heat insulated refrigerated compartment 11 having an opening 12 in the front wall thereof, and a heat insulated door 13 for closing the opening 12. The compartment 11 is cooled by a refrigerating machine including a refrigerant evaporator 14 arranged in the upper portion of the compartment 11. The refrigerating machine is not illustrated but may be of any conventional type. A shelf 15 is supported in any suitable manner as on the side walls of the refrigerated compartment 11 below the evaporator 14, the shelf 15 being arranged to support a food storage receptacle 16.

The receptacle 16 comprises a food supporting member 17 and a cove rmember 18. The lower member 17 has a bottom wall 19 and upwardly extending side walls 20 defining an open-topped food storage receptacle. The cover member 18 is arranged to seat on an outwardly extending flange 21 extending about the upper marginal edge of the lower member 17 in order to close the top of the receptacle.

In order to provide a ventilating opening between the interior and exterior of the receptacle 16, I have provided an aperture or opening 22 in a wall of the lower member 17 of the receptacle 16. As illustrated in the drawing, the aperture 22 is formed by cutting away a portion at the marginal edge of the receptacle member 17 although the aperture 22 may be disposed at any desired place in any of the walls of the receptacle.

In order to provide for selective amounts of ventilation through the aperture 22, I have provided depending ribs 23 and 24 extending along opposite edges of the cover member 18. As best shown in Figs. 3 and 4, the rib or leg 23 is considerably shorter than the rib 24, rib 24 preferably being longer than the depth of the opening or aperture 22. When the cover 18 is placed upon the receptacle member 17, as shown in Fig. 4, with the longer rib 24 adjacent the opening 22, the opening 22 is closed and the only ventilation between the interior and exterior of the receptacle 16 is that resulting because of manufacturing inaccuracies encountered in large scale production. I have found that these manufacturing inaccuracies prevent an airtight fit between receptacle member 17 and cover member 18, thereby maintaining a slight amount of ventilation to provide a relative humidity within the receptacle 16 of approximately 95 per cent to 100 per cent. When the cover member 18 is placed on the receptacle member 17 with the short rib 23 adjacent the opening 22, as shown in Fig. 3, the opening 22 is substantially unobstructed and an increased amount of ventilation is provided. With this last mentioned arrangement I have found that a relative humidity of approximately 85 per cent is maintained within the receptacle 16.

In order to retain the cover member 18 in place on the lower member 17, I have provided outwardly and downwardly extending flanges 25 along opposite sides of the cover member 18 which cooperate with the flange 21 of the lower member 17 to prevent sidewise movement of the cover member 18. The ribs 23 and 24 extend along opposite ends of the cover member 18 in such a manner as to engage the inner surface of the lower member 17, thereby preventing a lengthwise movement of the cover member 18.

While the ribs 23 and 24 have been illustrated as extending substantially the full width of the cover member 18, it will be understood that rib 24 need only extend slightly more than the width of the opening 22, rib 23 being provided to assist in retaining the cover member 18 in place. Moreover, while the opening 22 has been illustrated in the front wall of the receptacle 16, it will be apparent that the ventilating opening may be arranged in any wall of the receptacle. Further, instead of completely closing the opening 22 in one of the selective ventilating positions, the rib 24 may be shortened in order to provide a small amount of ventilation whenever desirable, when the cover member 18 is disposed in the position shown in Fig. 4.

It is also within the spirit of my invention to arrange the ventilating opening in the cover member instead of the receptacle member and to provide a rib or other suitable closure member on the receptacle member in such a manner that selective ventilation may be had by reversing the cover in order to close or unobstruct the opening.

While I have shown the particular embodiment of my invention in connection with a household refrigerator, I do not desire my invention to be limited to the particular construction shown and described, and I intend in the appended claims to cover all modifications within the spirit and scope of my invention.

What I claim as new and desire to secure by Letters Patent of the United States is:

1. In a food storage receptacle, an open-sided member, a cover member for closing said open side, one of said members having a ventilating aperture therethrough, and means for selectively providing different amounts of ventilation through said aperture, said means including a pair of elements carried by the other of said members, said elements being of different areas and so constructed and arranged that the aperture is substantially unobstructed in one position of said cover member and is substantially closed in another position of said cover member.

2. A food storage receptacle having walls defining an open-topped member, the marginal edge of said member having a cut-away portion to provide a ventilating aperture, a cover member resting on said edge, ribs extending along opposite edges of and depending from said cover, one of said ribs being relatively longer than the other of said ribs, said ribs being dimensioned so that when said cover member is placed on said receptacle with said longer rib adjacent said aperture, said longer rib extends below said cut-away portion, thereby limiting the amount of ventilation through said aperture, but when said cover member is disposed on said open-topped member with the shorter rib adjacent said cut-away portion, an increased amount of ventilation is provided.

3. A food storage receptacle having walls defining an open-topped member, the marginal edge of said member having a cut-away portion to provide a ventilating aperture, a cover member resting on said edge, ribs extending along opposite ends of and depending from said cover, one of said ribs being relatively longer than the other of said ribs, said ribs being dimensioned so that when said cover member is placed on said receptacle with said longer rib adjacent said aperture, said aperture is covered, thereby restricting the amount of ventilation through said aperture, but when said cover member is placed with the shorter rib adjacent said aperture, an increased amount of ventilation is provided, said ribs also engaging the adjacent inner surfaces of said open-topped member for retaining said cover member in place.

4. A food storage receptacle having walls defining an open-topped member, the marginal edge of said member having a cut-away portion to provide a ventilating aperture, a cover member resting on said edge, ribs extending along opposite edges of and depending from said cover, one of said ribs being relatively longer than the other, said ribs being dimensioned so that when said cover member is placed on said receptacle with said longer rib adjacent the aperture, a smaller area of unobstructed opening is provided than when said cover member is disposed on said open-topped member with the shorter rib adjacent the aperture, whereby the amount of ventilation is selectively determined by the position in which said cover member is placed on said receptacle.

GEORGE C. HARBISON.